(12) United States Patent
Choi (10) Patent No.: US 6,386,313 B1
(45) Date of Patent: May 14, 2002

(54) GEAR RATIO VARIABLE TYPE STEERING DEVICE

(75) Inventor: Byung-Yun Choi, Wonju (KR)

(73) Assignee: Mando Corporation (KR)

( * ) Notice: Subject to any disclaimer, the term of this patent is extended or adjusted under 35 U.S.C. 154(b) by 0 days.

(21) Appl. No.: 09/887,396

(22) Filed: Jun. 22, 2001

(30) Foreign Application Priority Data

May 3, 2001 (KR) ............................................. 01-24102

(51) Int. Cl.[7] .................................................. B62D 5/02
(52) U.S. Cl. ..................... 180/447; 180/444; 280/93.51; 474/83
(58) Field of Search ................................ 180/444, 447, 180/443, 446; 280/771, 778, 93.51, 93.509, 93.513, 93.514; 74/496, 516, 492, 37; 474/24, 39, 83

(56) References Cited

U.S. PATENT DOCUMENTS

| 5,267,625 A | * | 12/1993 | Shimizu | |
| 5,284,219 A | * | 2/1994 | Shimizu et al. | |
| 5,298,000 A | * | 3/1994 | Rattude et al. | ................ 474/24 |
| 5,482,130 A | * | 1/1996 | Shimizu | ..................... 180/447 |
| 5,511,629 A | * | 4/1996 | Vogel | |
| 6,041,887 A | * | 3/2000 | Kojo | ........................... 180/446 |
| 6,179,083 B1 | * | 1/2001 | Yamauchi | .................... 180/444 |
| 6,302,441 B1 | * | 10/2001 | Kawamuro | ................. 280/771 |

* cited by examiner

Primary Examiner—Anne Marie Boehler
(74) Attorney, Agent, or Firm—R. Neil Sudol; Henry Coleman; William Sapone

(57) ABSTRACT

The present invention relates to a gear ratio variable type steering device which includes a variable gear mechanism between a steering wheel and a gear box for varying a gear ratio based on the speed of a vehicle. The variable gear mechanism includes an input shaft for receiving a rotational force of the steering wheel, an output shaft for transferring a rotational force to the gear box, a variable pulley installed in the outer portions of the input shaft and the output shaft and moved in the axial direction, a belt for connecting the variable pulley, and a motor for varying a gear ratio by moving the variable pulley in the axial direction.

13 Claims, 10 Drawing Sheets

GEAR RATIO VARIABLE TYPE STEERING DEVICE

BACKGROUND OF THE INVENTION

1. Field of the Invention

The present invention relates to a gear ratio variable type steering device, and in particular to a gear ratio variable type steering device which is capable of varying a linear displacement of a rack bar based on the revolution of a steering wheel in accordance with the speed of a vehicle.

2. Description of the Background Art

Generally, a steering device of a vehicle is constructed in such a manner that a linear displacement of a rack bar is constantly generated when a driver rotates a steering wheel. The thusly generated linear displacement is expressed as 40 mm/rev. The gear ratio affects the characteristics of the steering operation of the vehicle.

Figure 1:
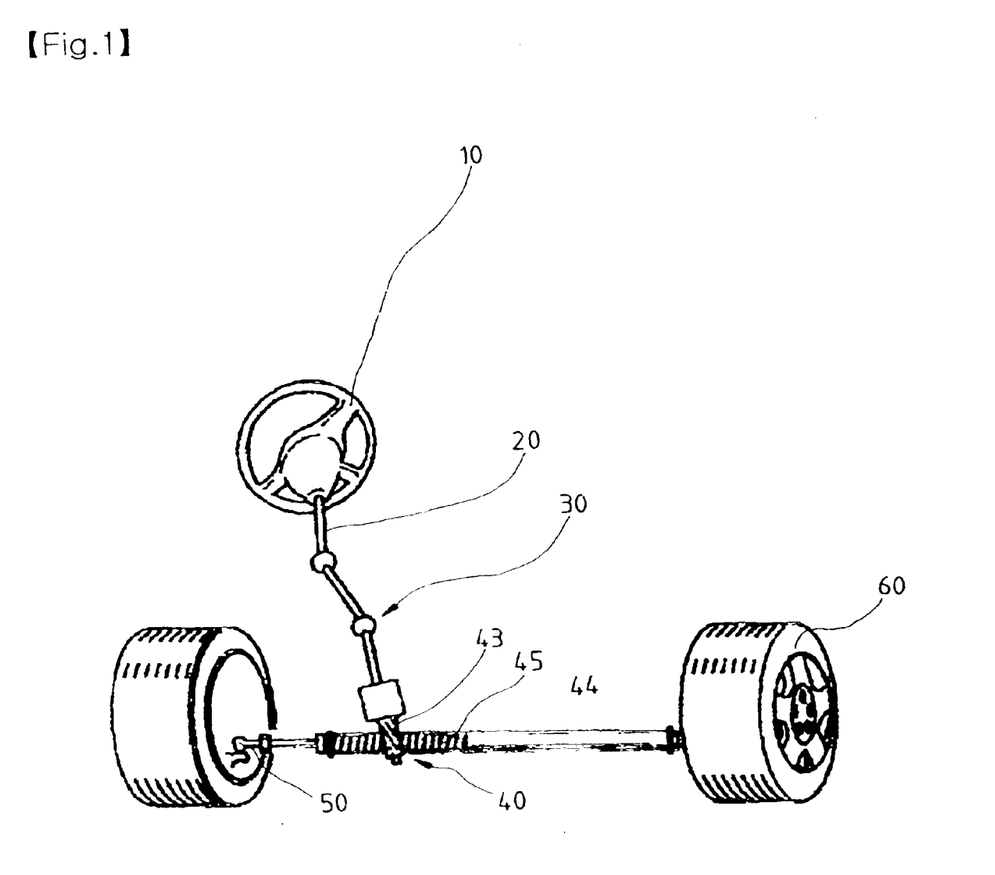
FIG. 1 is a perspective view illustrating a conventional steering device.

FIG. 1 is a perspective view illustrating a conventional steering device. As shown therein, the conventional steering device includes a steering wheel 10 for generating a steering force based on a driver's operation, a column 20 connected with the lower potion of the same, a universal joint 30 connected to the lower portion of the column 20, and a gear box 40 installed below the same.

Figure 2:
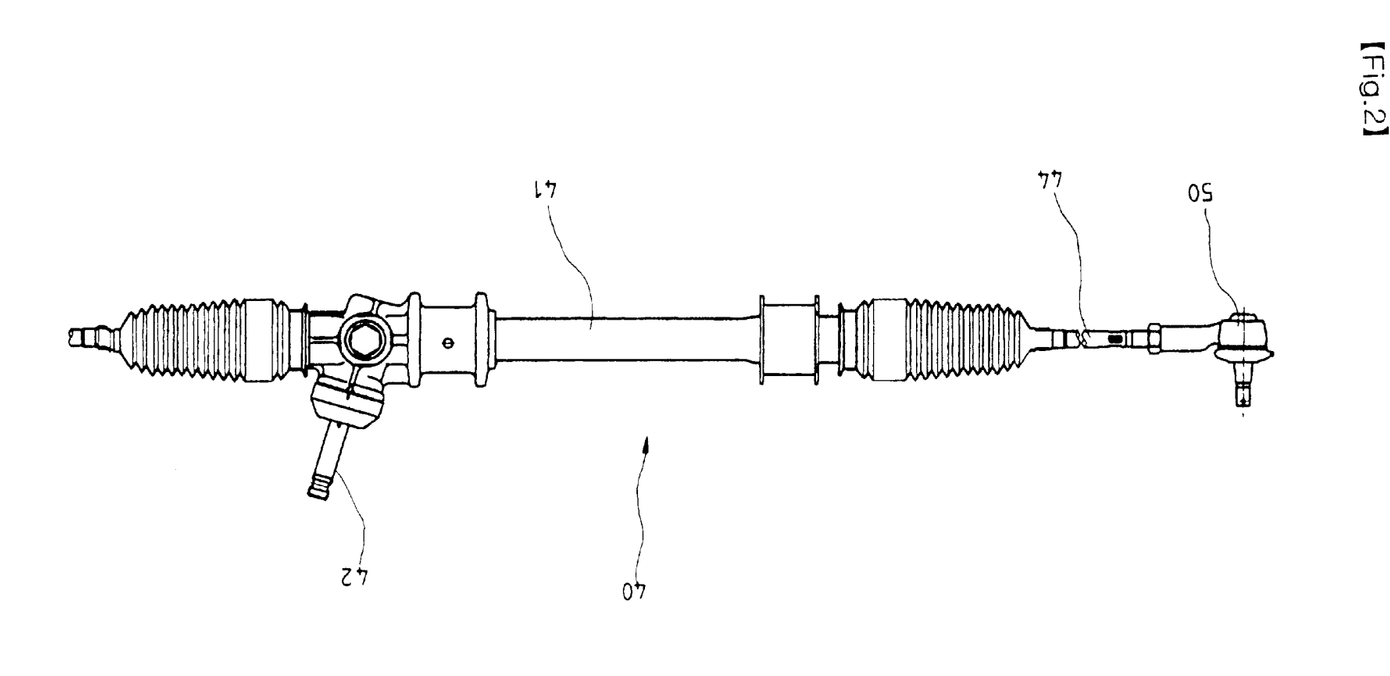
FIG. 2 is a front view illustrating a conventional gear box.
Figure 3:
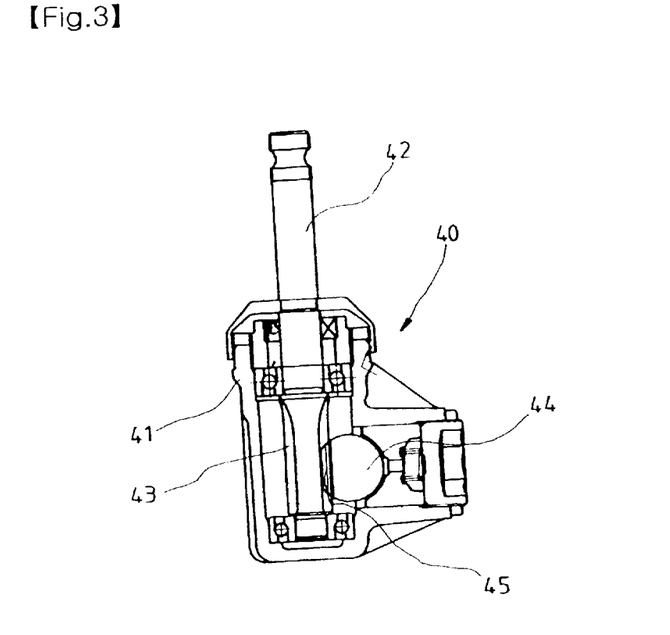
FIG. 3 is a cross-sectional view illustrating a conventional gear box.

FIG. 2 is a front view illustrating the gear box, and FIG. 3 is a cross-sectional view of the same. As shown therein, a housing 41 which forms the outer construction of the gear box 40 is provided.

In addition, a hollow input shaft 42 is protrudely installed in the housing 41 for receiving a steering force generated by the steering force.

A pinion gear 43 is integrally provided at the lower portion of the input shaft 42. A rack bar 44 having a rack gear 45 at one side of the same is installed at the lower portion of the housing 41 for a linear movement based on an engagement with the pinion gear 43.

At this time, the rack bar 44 is displaced axially across the rack gear 45, and a ball joint 50 connected with the steering member 60 is installed at both ends of the rack bar 44.

In the thusly constructed conventional steering device, when a driver rotates the steering wheel 10, the input shaft 42 is rotated, and the rack bar 44 is linearly operated based on the gear ratio which is determined when designing the vehicle and angular-operates the steering member 60.

In the conventional steering device, since a certain gear ratio is constantly generated irrespective of a low speed or high speed operation, the distance of the movement of the rack bar becomes same based on the revolution of the input shaft.

Therefore, it is impossible to generate a large movement of the rack bar by rotating the steering wheel by a small amount at a low speed operation and generate a small movement of the rack bar by rotating the steering by a large amount at a high speed operation.

Namely, the conventional steering device is designed based on a constant gear ratio. Therefore, it is needed to rotate the steering wheel by a large amount in the case of the low speed operation and parking operation which need a large steering angle for thereby causing much inconvenience. In the case of the high speed operation which needs a small steering angle, the large steering angle is generated which is not proper to the high speed operation, so that it is impossible to obtain a certain steering stability.

SUMMARY OF THE INVENTION

Accordingly, it is an object of the present invention to provide a gear ratio variable type steering device which overcomes the problems encountered in the conventional art.

It is another object of the present invention to provide a gear ratio variable type steering device which includes a variable gear mechanism between a steering wheel and a gear box for varying a gear ratio based on the speed of a vehicle.

To achieve the above objects, there is provided a gear ratio variable steering device a gear ratio variable type steering device which comprises a variable gear mechanism which includes an input shaft for receiving a rotational force of the steering wheel, an output shaft for transferring a rotational force to the gear box, a variable pulley installed in the outer portions of the input shaft and the output shaft and moved in the axial direction, a belt for connecting the variable pulley, and a motor for varying a gear ratio by moving the variable pulley in the axial direction.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The present invention will be explained with reference to the accompanying drawings.

Figure 4:
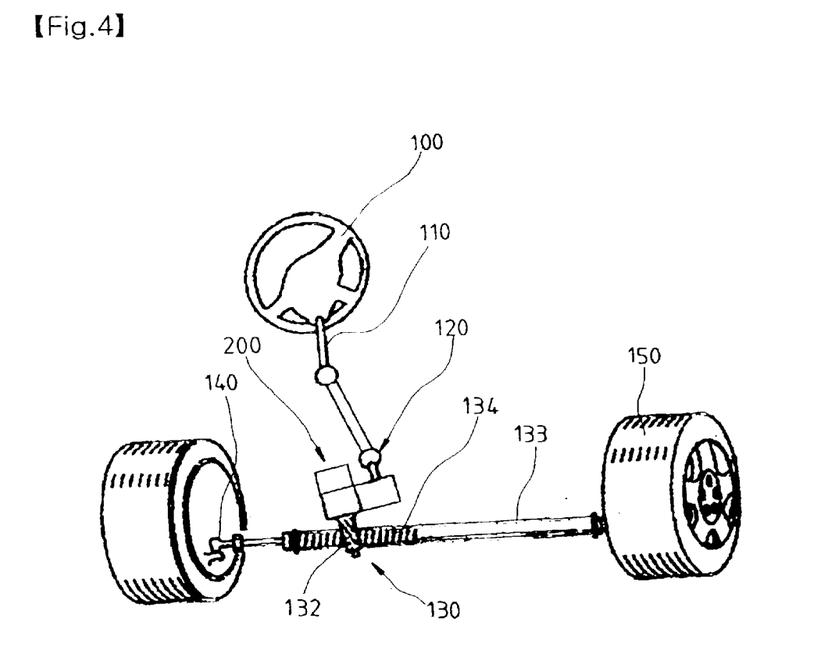
FIG. 4 is a perspective view illustrating a steering device according to the present invention.

FIGS. 4 through 9 are views illustrating an embodiment of the present invention. First, as shown in FIG. 4, a steering wheel 100 is provided for generating a steering force based on a driver's operation.

In addition, a column 110 is connected with a lower portion of the steering wheel 100, and a universal joint 120 is connected with a lower portion of the column 110.

A gear box 120 is provided at a lower portion of the universal joint 120 axially with respect to the same in such a manner that the steering member 150 is directly operated.

Figure 5:
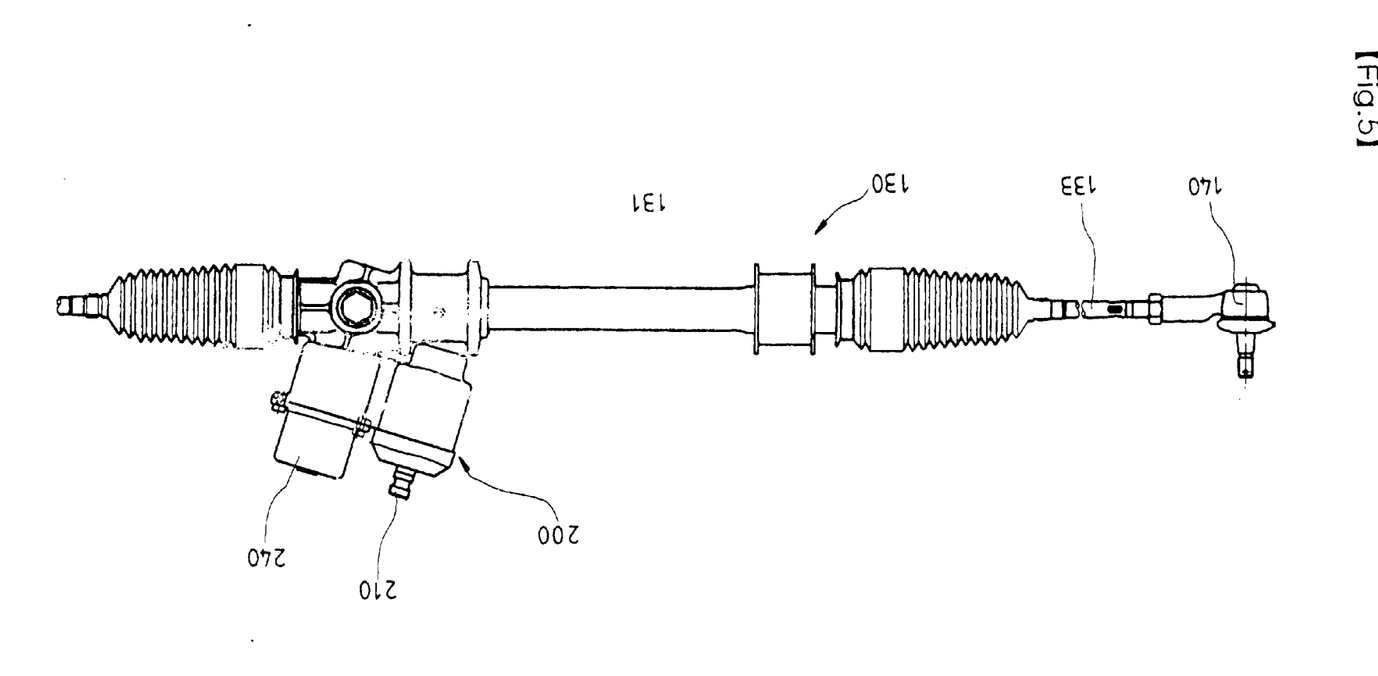
FIG. 5 is a front view illustrating a gear box according to the present invention.

FIG. 5 is a view illustrating a gear box according to the present invention. As shown therein, a hollow housing 131 is provided for forming an outer construction of the gear box 130.

A longitudinal rack bar 133 is installed in the interior of the housing 131 for implementing a linear movement in the axial direction.

At this time, a ball joint 140 connected with the steering member 150 is installed at both ends of the rack bar 133, and a rack gear 134 is provided at an intermediate portion of the rack bar 133.

Figure 6:
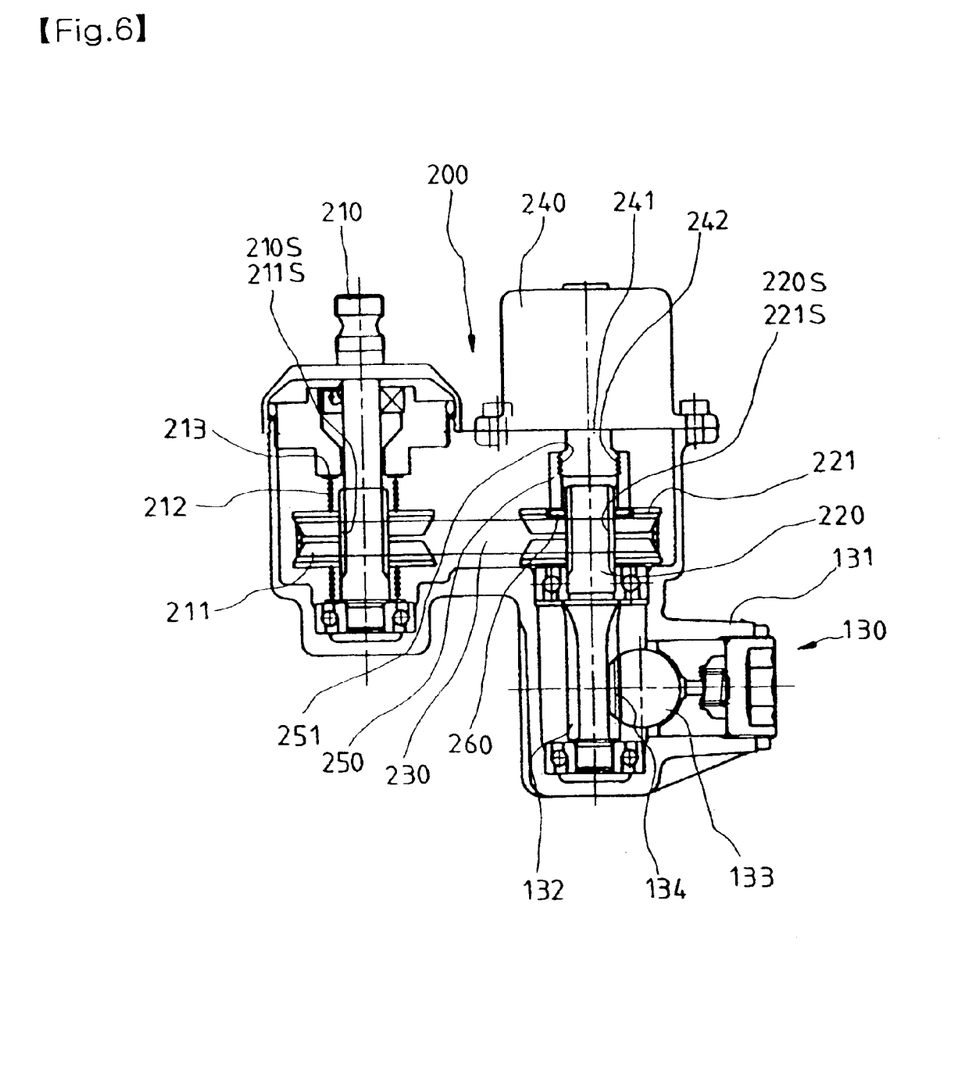
FIG. 6 is a cross sectional view illustrating a gear box according to the present invention.

An input shaft 210 is installed in the interior of the housing 131 in such a manner that the upper end of the same is protruded to the outside o the housing 131 for thereby receiving a steering force generated in the steering wheel 100.

An output shaft 220 is installed in the side surface of the input shaft 210 and is distanced parallely with the input shaft 210. A pinion gear 132 is integrally installed in the output shaft 220. The input shaft 210 and the output shaft 220 are rotatably based on the bearing in the interior of the housing 131.

At this time, the pinion gear 132 is engaged with the rack gear 134 of the rack bar 133.

A belt 230 is connected between the input shaft 210 and the output shaft 220 for transferring a force therebetween. Two variable pulleys 211 and 221 are installed in the outer surfaces of the input shaft 210 and the output shaft 220.

Figure 7:
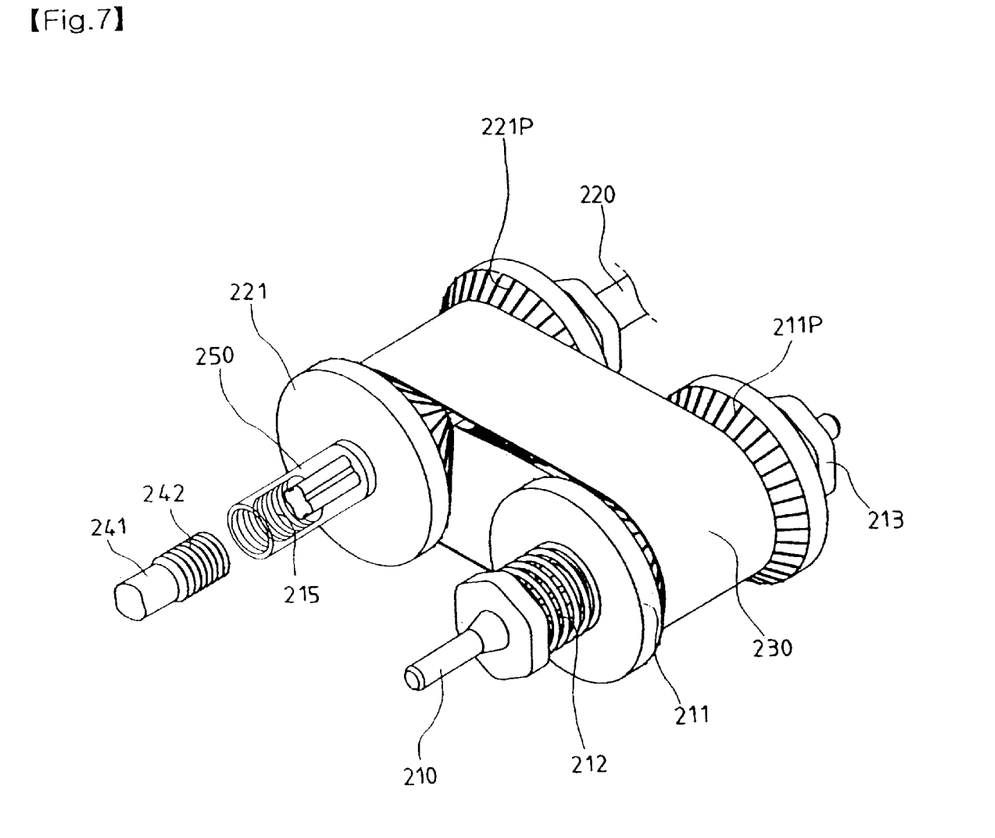
FIG. 7 is a perspective view illustrating a variable pulley of a variable gear mechanism according to the present invention.

In the variable pulley 210 installed in the outer surface of the input shaft 210, two tapered circular columns are opposite to each other.

Splines 211S and 210S are formed in the inner surface of the variable pulley 211 and the outer surface of the input shaft 210, and the variable pulley 211 is moved in the axial direction outside the input shaft 210 and is cooperated with the input shaft 210 in the revolution direction.

At this time, one side of the variable pulley may be fixed, and the other side of the same may be moved.

Two springs 212 are installed at both sides of the variable pulley 211 in the outer surface of the input shaft 210 so that the same are closely installed by supporting the variably pulley 211 in the axial directions.

In the case that when the variable pulley 211 is misaligned, the springs 212 automatically compensates the misaligned state.

A plurality of protrusions 211 P are longitudinally formed from the center to the outer portion in the tapered outer surface of the variable pulley 211 for preventing a sliding of the belt 230.

A plate 213 is installed in a portion opposite to the variable pulley 211 for a smooth operation of the spring 212 for thereby supporting the springs 212. A spline 220S is formed in an outer surface of the output shaft 220. The variable pulley 221 is divided into two tapered circular columns like the variable pulley 221 installed in the input shaft 210. A spline 221S is formed in the inner surface, and a plurality of protrusions 221P are formed in the outer surface of the same.

At this time, one side of the variable pulley 221 installed in the outer portion of the output shaft 220 is fixed at the output shaft 220 differently from the variable pulley 211 installed in the input shaft 210, so that the other side of the same is movable.

Namely, the lower side of the variable pulley installed in the side of the pinion gear 132 is fixed in the axial direction, and the output shaft 200 is moved in the axial direction.

The belt 230 connected between the variable pulleys 211 and 221 is formed of a V-belt having a tapered surface at both sides of the same, so that the tapered outer surfaces of the variable pulleys 211 and 221 are closely contacted with the belt 230.

A motor 240 is installed at one end of the output shaft 220 for adjusting a gear ratio between two variable pulleys 211 and 221 installed in the input shaft 210 and the output shaft 220.

The motor 240 is formed of an actuator for moving the variable pulley 221 at the side of the output shaft 220 and is installed in such a manner that a motor shaft 241 is inserted into the interior of the housing 131. A screw 242 is formed in an outer surface end portion of the motor shaft 241.

The motor 240 is operated based on a signal of an ECU(Electric Control Unit). The ECU analyses a speed and operation state of the vehicle and applies a proper current to the motor 240 for thereby generating a proper gear ratio based on the speed of the vehicle tuned when designing the vehicle for thereby implementing an optimum steering performance.

At this time, the motor 240 may be formed of a common motor or a stepping motor.

A connection pipe 250 is installed at an end of the motor shaft 241 based on a threaded connection method and is moved in the axial direction for thereby converting a rotational force of the motor 240 into a linear operation force.

The connection pipe 250 is installed in the interior of the housing 131 and is moved in the axial direction, and one end of the same is installed based on a thrust bearing 260 for thereby decreasing an axial direction friction force between the upper side variable pulleys 221.

A screw 251 is formed in an inner portion of the other end of the connection pipe 250, so that the screw 242 of the motor shaft 241 is thread-engaged and is operated in the axial direction when the motor 240 is operated.

Figure 8:
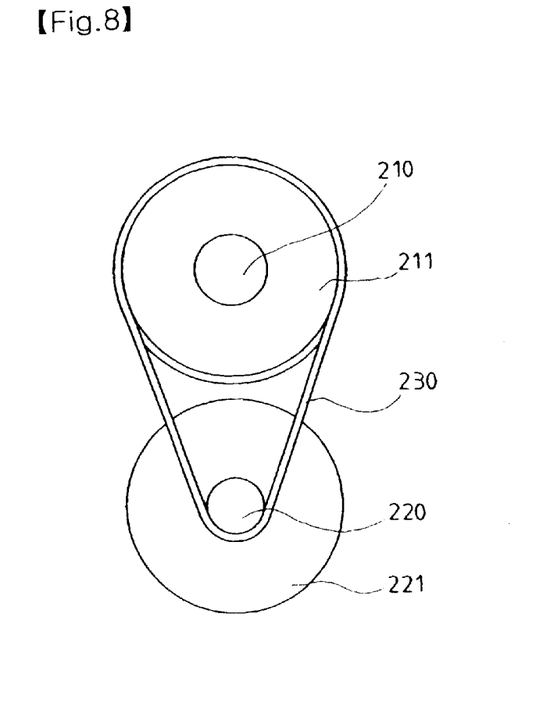
FIG. 8 is a view illustrating an operation of a variable gear mechanism at a low speed according to the present invention.
Figure 9:
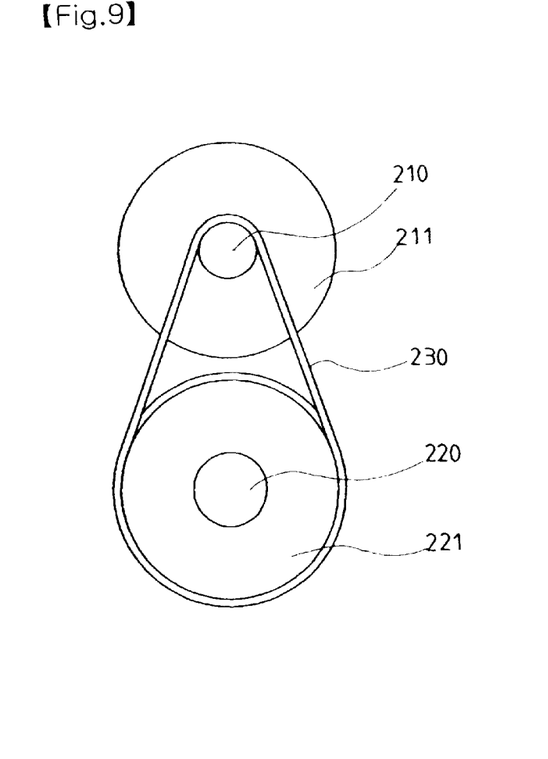
FIG. 9 is a view illustrating an operation of a variable gear mechanism at a high speed according to the present invention.

As shown in FIGS. 8 and 9, the gear ratio variable type steering apparatus according to the present invention is capable of varying a gear ratio between the variable pulleys at a high speed operation and a low speed operation.

As shown in FIG. 8, when a vehicle runs at a low speed or is parked, since the steering wheel 100 is rotated more, so that the steering operation is more easily implemented when the movement distance of the rack bar 133 is relatively longer compared to the revolution of the steering wheel 100. (the revolution of the input shaft <the revolution of the output shaft).

At this time, the current value tuned by the ECU which receives a data concerning the speed of the vehicle is applied to the motor 240, so that the motor 240 is operated at a proper revolution.

Therefore, the connection pipe 250 is moved in the axial direction toward the motor 240, and the distance between the output shaft 220 and the variable pulley 221 is increased by the belt 230.

The force transferred through the belt 230 is generated when the belt 230 is closely contacted with the outer diameter sides of the variable pulley 211 and the input shaft 210 which are closely contacted with the spring 212.

Namely, the distance from the variable pulleys 211 is decreased, and the belt 230 is closely contacted with the inner diameter sides of the variably pulley 221 and the output shaft 220. On the contrary, the distance between the input shaft 210 and the variable pulley 211 is decreased by the spring 212, so that the belt 230 is closely contacted with the outer diameter side of the variably pulley 211 of the input shaft 210.

Therefore, the revolution of the variable pulley 221 of the output shaft 220 is increased compared to the revolution of the variable pulley 211 of the input shaft 210. As a result, the moving distance of the rack bar 133 is relatively increased compared to the revolution of the steering wheel 100.

As shown in FIG. 9, when the vehicle runs at a high speed, the steering operation is easily implemented in the case that the moving distance of the rack bar 133 is relatively smaller compared to the revolution of the steering wheel 100. (the revolution of the input shaft >the revolution of the output shaft).

The connection pipe 250 pushes the variable pulley 221 of the output shaft 220 based on the rotational force of the motor 240, and the output shaft 220 and the variable pulley 221 are moved in the direction that the output shaft 220 and the variable pulley 221 are opposite each other, so that the distance therebetween is decreased.

At this time, the belt 230 having a certain width is closely contacted in the direction of the outer diameter side of the variable pulley 221. On the contrary, the distance between the input shaft 210 and the variable pulley 211 is increased, and the belt 230 is closely contacted in the direction of the inner diameter sides of the input shaft 210 and the variable pulley 211.

Therefore, the revolution of the output shaft 220 and the variable pulley 221 is decreased compared to the revolution of the input shaft 210 and the variable pulley 211. As a result, the moving distance of the rack bar 133 is relatively decreased compared to the revolution of the steering wheel 100.

Figure 10:
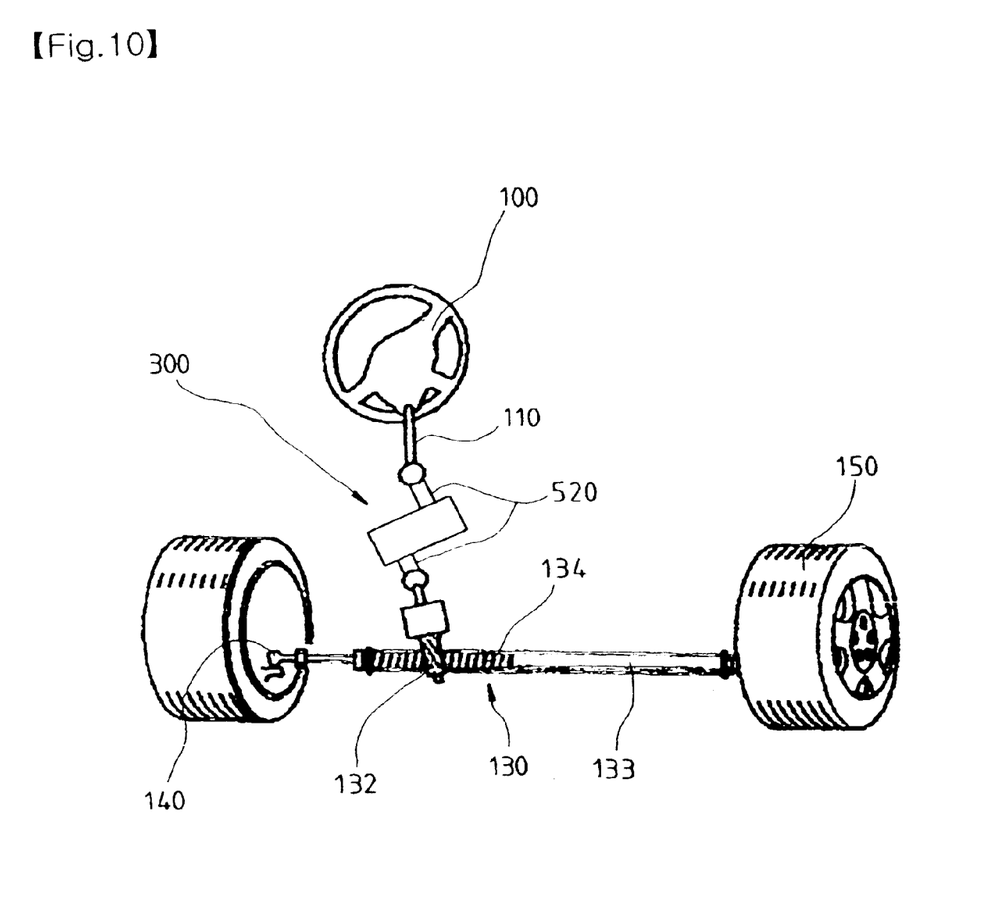
FIG. 10 is a view illustrating another embodiment of the present invention.
Figure 11:
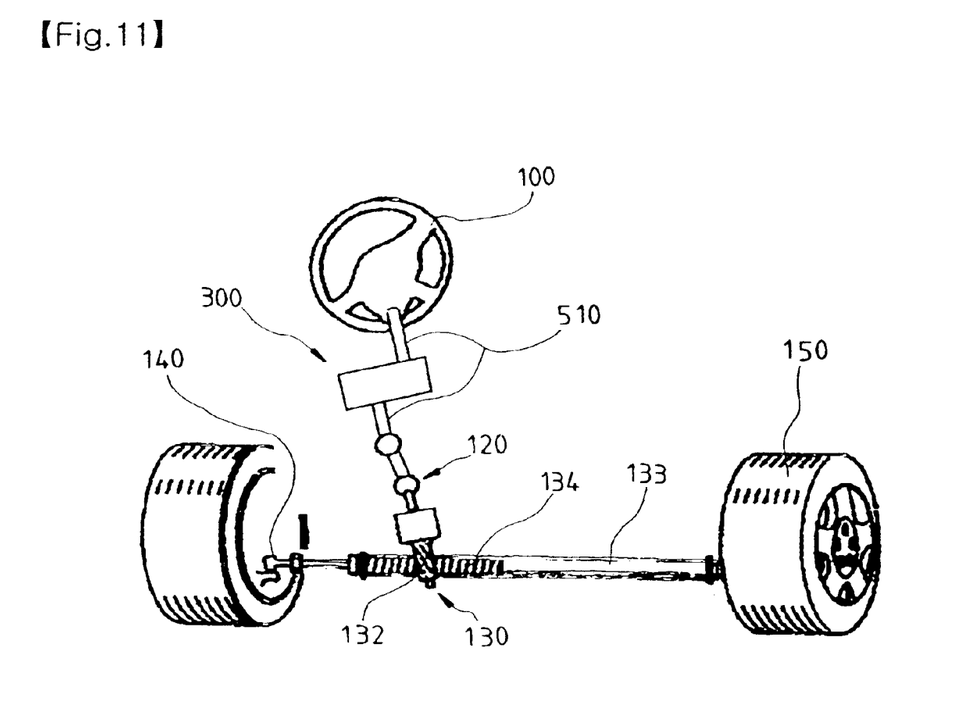
FIG. 11 is a view illustrating still another embodiment of the present invention.
Figure 12:
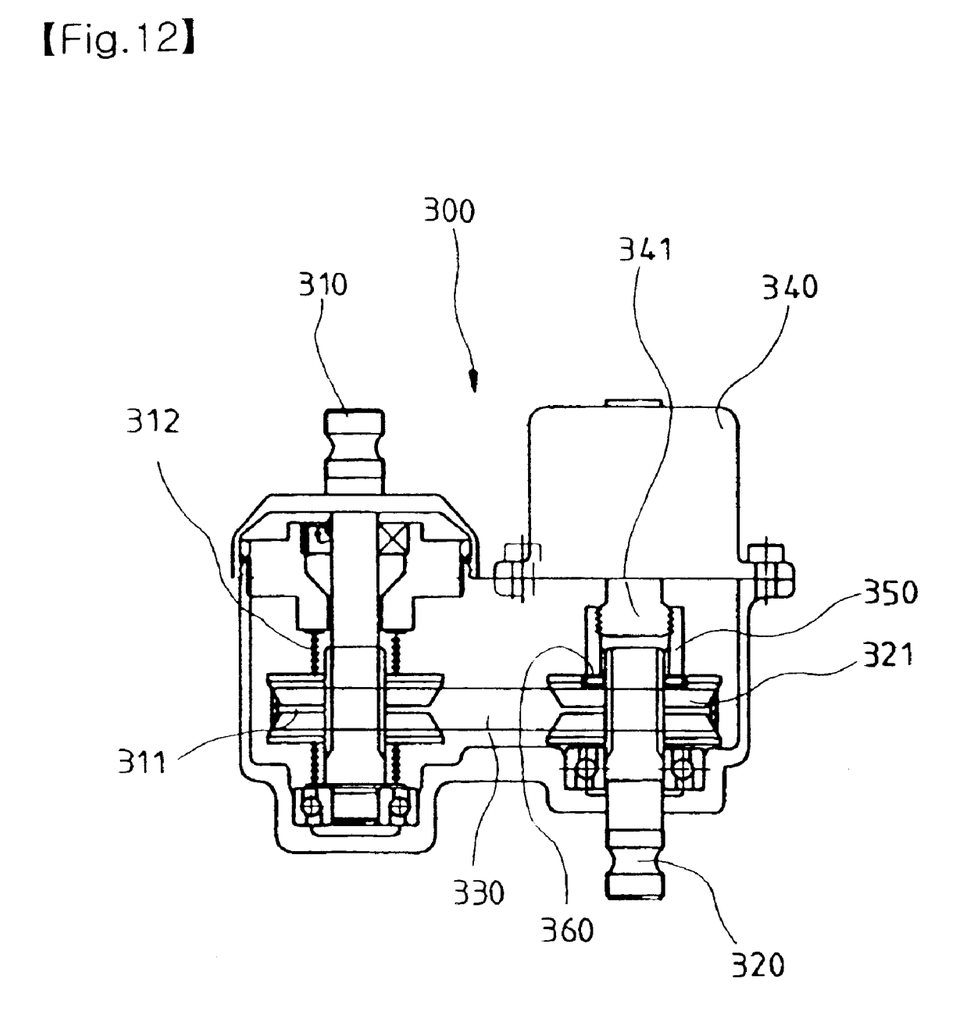
FIG. 12 is a cross sectional view illustrating a variable gear mechanism adapted to FIGS. 10 and 11 according to the present invention.

FIG. 10 is a view illustrating another embodiment of the present invention, FIG. 11 is a view illustrating still another embodiment of the present invention, and FIG. 12 is a cross sectional view illustrating a variable gear mechanism adapted to FIGS. 10 and 11 according to the present invention.

As shown in FIG. 10, in another embodiment of the present invention, the variable gear mechanism 300 is provided in the universal joint 520.

At this time, in this embodiment, the variable gear mechanism 300 is not directly connected with the output shaft. Both side portions of the universal joint 520 formed in the input shaft 310 and the output shaft 320 are connected for thereby reciprocating the connection pipe 350 based on the rotation of the motor 340, so that the rotational force transferred through the variable pulleys 311 and 321 and the belt 330 is controlled.

As shown in FIG. 11, in still another embodiment of the present invention, the variable gear mechanism 300 according to the present invention is installed in the column 510.

In the variable gear mechanism 300, both sides portions of the column 510 are connected, and the rotational force transferred through the variable pulleys 311 and 321 and the belt 330 is controlled.

Therefore, the variable gear mechanism according to the present invention may be installed in a certain portion among the driving force connection portions of the steering device for thereby easily installing the variable gear mechanism.

As described above, in the present invention, there is provided a variable gear mechanism, so that it is possible to vary the linear displacement amount of the rack bar based on the revolution of the steering wheel. Namely, when the vehicle runs at a high speed, a stable steering operation and a good directional stability are implemented. When the vehicle runs at a lower speed, since the steering angle is increased, it is possible to provide a driver with a light and smooth steering operation.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a steering device which has a universal joint installed based on a column for thereby receiving a rotational force from a steering wheel, and a gear box having a rack bar moved in an axial direction based on a rotational force transferred from the universal joint, a gear ratio variable steering device, comprising:
    a variable gear mechanism including:
        an input shaft for receiving a rotational force of the steering wheel;
        an output shaft for transferring a rotational force to the gear box;
        pulleys installed in the outer portions of the input shaft and the output shaft, at least one of said pulleys being a variable pulley move in axial direction;
        a belt for connecting the variable pulleys, and
        a motor for varying a gear ratio by moving a portion of the variable pulley in the axial direction.

2. The steering device of claim 1, wherein said variable pulley is separated into two tapered circular columns, and the portions of the same having smaller diameters are opposite to each other.

3. The steering device of claim 2, wherein said belt is a V-belt having a V-shaped cross section for thereby being closely contacted with an outer surface of the variable pulley.

4. The steering wheel of claim 3, wherein a spring is provided at both sides of the variable pulley installed in the input shaft for pressing the variable pulley against the belt.

5. The steering wheel of claim 4, wherein one side of said variable pulley installed in the output shaft is fixed at the output shaft, and the other side of the same is moved by the motor in the axial direction.

6. The steering wheel of claim 5, wherein a screw is formed in an end portion of a motor shaft extended from the motor, and a connection pipe is installed in the interior of the variable gear mechanism and is reciprocated, and an inner portion of one end of the pipe is engaged with the screw, and the other end of the pipe presses the other side of the variable pulley which is moved along the output shaft in the axial direction.

7. The steering wheel of claim 6, wherein a thrust bearing is provided between the connection pipe and the other side of the variable pulley which is moved in the axial direction along the output shaft.

8. The steering wheel of claim 1, wherein said variable gear mechanism is constructed in one side of the gear box in such a manner that the input shaft is connected with the universal joint, and the output shaft is connected with the rack bar.

9. The steering wheel of claim 1, wherein a spline is installed in the outer surfaces of the input shaft and output shaft and in the inner surface of the variable pulley.

10. The steering wheel of claim 1, wherein a plurality of protrusions are formed in the outer surface of the variable pulley for preventing a sliding of the belt.

11. The steering wheel of claim 1, wherein said motor is a stepping motor.

12. The steering wheel of claim 1, wherein in said variable gear mechanism, the input shaft is connected at one side of the column which is divided and the output shaft is connected to the other side of the same.

13. The steering wheel of claim 1, wherein in said variable gear mechanism, the input shaft is connected to one side of the universal joint which is divided, and the output shaft is connected to the other side of the same.

* * * * *